United States Patent
Liu et al.

(10) Patent No.: US 10,572,671 B2
(45) Date of Patent: Feb. 25, 2020

(54) CHECKING METHOD, CHECKING SYSTEM AND CHECKING DEVICE FOR PROCESSOR SECURITY

(71) Applicant: Tsinghua University, Beijing (CN)

(72) Inventors: Leibo Liu, Beijing (CN); Ao Luo, Beijing (CN); Shaojun Wei, Beijing (CN)

(73) Assignee: Tsinghua University, Beijing (CN)

( * ) Notice: Subject to any disclaimer, the term of this patent is extended or adjusted under 35 U.S.C. 154(b) by 37 days.

(21) Appl. No.: 15/894,042

(22) Filed: Feb. 12, 2018

(65) Prior Publication Data
US 2018/0239907 A1 Aug. 23, 2018

(30) Foreign Application Priority Data

Feb. 20, 2017 (CN) .......................... 2017 1 0089783
May 8, 2017 (CN) .......................... 2017 1 0316463

(51) Int. Cl.
*H04L 29/06* (2006.01)
*G06F 21/57* (2013.01)
(Continued)

(52) U.S. Cl.
CPC ........ *G06F 21/577* (2013.01); *G06F 12/0835* (2013.01); *G06F 12/1081* (2013.01); *G06F 2212/621* (2013.01); *G06F 2221/034* (2013.01)

(58) Field of Classification Search
CPC .................................................. G06F 21/577
See application file for complete search history.

(56) References Cited

U.S. PATENT DOCUMENTS 6,751,751 B1 6/2004 Murray et al.
6,757,831 B1 6/2004 Folmsbee
(Continued)

FOREIGN PATENT DOCUMENTS

CN 102508748 A 6/2012
CN 102591717 A 7/2012
(Continued)

OTHER PUBLICATIONS

Zhang, Jie, Feng Yuan, and Qiang Xu."Detrust: Defeating hardware trust verification with stealthy implicitly-triggered hardware trojans." Proceedings of the 2014 ACM SIGSAC Conference on Computer and Communications Security. ACM, 2014. (Year: 2014).*
(Continued)

*Primary Examiner* — Shawnchoy Rahman
(74) *Attorney, Agent, or Firm* — Posz Law Group, PLC (57) ABSTRACT

The present disclosure discloses a processor security checking method, system and checking device. The processor security checking method includes: acquiring recording information of data read and write operations between a processor and a peripheral device, where the data read and write operation is a data read and write operation initiated by the processor or a data read and write operation initiated by the peripheral; and determining whether the processor is secure according to the recording information of the data read and write operation and an analysis result on the data read and write operation by the checking device. The embodiments of the present disclosure may detect hardware vulnerabilities and improve the security of hardware usage.

16 Claims, 2 Drawing Sheets

---

┌─ 101

Acquiring a recording information of data read and write operation between the processor and the peripherals, wherein the data read and write operation being a data read and write operation initiated by the processor or a data read and write operation initiated by the peripherals

┌─ 102

Determining whether the processor is secure according to the recording information of the data read and write operation and an analysis result on the data read and write operation by the checking device (51) Int. Cl.
*G06F 12/1081* (2016.01)
*G06F 12/0831* (2016.01)

(56) References Cited

U.S. PATENT DOCUMENTS

| | | | |
|---|---|---|---|
| 6,775,729 B1 * | 8/2004 | Matsuo | G06F 3/1211 |
| | | | 710/260 |
| 7,188,219 B2 | 3/2007 | Jeddeloh | |
| 7,373,521 B1 * | 5/2008 | Kawahara | G06F 13/38 |
| | | | 235/379 |
| 7,664,937 B2 | 2/2010 | Jacob et al. | |
| 7,941,569 B2 | 5/2011 | Parthasarathy et al. | |
| 8,336,767 B1 * | 12/2012 | Graef | G07F 19/20 |
| | | | 235/379 |
| 8,533,834 B1 | 9/2013 | Wong et al. | |
| 8,713,370 B2 | 4/2014 | Millet et al. | |
| 8,996,817 B2 | 3/2015 | Bushen | |
| 9,069,953 B2 | 6/2015 | Bellocchio et al. | |
| 9,268,959 B2 * | 2/2016 | Paczkowski | G06F 21/74 |
| 9,275,238 B2 * | 3/2016 | Wang | G06F 21/566 |
| 9,747,446 B1 | 8/2017 | Pidathala et al. | |
| 9,830,269 B2 | 11/2017 | McKean et al. | |
| 9,940,460 B1 | 4/2018 | Derbeko et al. | |
| 10,078,459 B1 | 9/2018 | Natanzon et al. | |
| 2005/0229164 A1 | 10/2005 | Giraud | |
| 2006/0090209 A1 | 4/2006 | Garay et al. | |
| 2009/0307770 A1 | 12/2009 | Harris et al. | |
| 2010/0017605 A1 | 1/2010 | Chieze et al. | |
| 2010/0083387 A1 * | 4/2010 | Rodgers | G06F 21/81 |
| | | | 726/36 |
| 2010/0192194 A1 | 7/2010 | Tan et al. | |
| 2012/0131387 A1 | 5/2012 | Salloum et al. | |
| 2013/0238904 A1 | 9/2013 | Salgado et al. | |
| 2014/0101373 A1 * | 4/2014 | Lee | G06F 3/0655 |
| | | | 711/103 |
| 2014/0380474 A1 | 12/2014 | Paithane et al. | |
| 2015/0020211 A1 * | 1/2015 | Lai | G06F 21/52 |
| | | | 726/27 |
| 2016/0042179 A1 | 2/2016 | Weingarten et al. | |
| 2016/0098558 A1 | 4/2016 | Vedula et al. | |
| 2016/0098565 A1 | 4/2016 | Vedula et al. | |
| 2016/0275289 A1 | 9/2016 | Sethumadhavan et al. | |
| 2016/0357660 A1 | 12/2016 | Dean et al. | |
| 2016/0357966 A1 | 12/2016 | Porat et al. | |
| 2017/0052868 A1 | 2/2017 | Robertson et al. | |
| 2017/0228562 A1 | 8/2017 | Gulley et al. | |
| 2017/0235961 A1 | 8/2017 | August et al. | |
| 2017/0286670 A1 | 10/2017 | Artman et al. | |
| 2017/0310688 A1 | 10/2017 | Lecomte et al. | |
| 2017/0315818 A1 * | 11/2017 | Shivanna | G06F 11/1417 |
| 2017/0329966 A1 | 11/2017 | Koganti et al. | |
| 2018/0032726 A1 | 2/2018 | Parinov et al. | |
| 2018/0032760 A1 | 2/2018 | Hu et al. | |
| 2018/0089099 A1 * | 3/2018 | Raj | G06F 12/10 |

FOREIGN PATENT DOCUMENTS

| | | | | |
|---|---|---|---|---|
| CN | 103676927 A | | 3/2014 | |
| CN | 104239616 A | | 12/2014 | |
| CN | 104866766 A | | 8/2015 | |
| CN | 105700999 A | | 6/2016 | |
| CN | 108345787 A | * | 7/2018 | |
| GB | 1282628 A | * | 7/1972 | G06F 12/1441 |

OTHER PUBLICATIONS

Gao, Hongbo, "Research on Detection Techniques of Instruction-triggered Hardware Trojan Horse," A Dissertation Submitted to PLA Information Engineering University for the Degree of Doctor of Engineering, Apr. 2013. (English abstract attached).
Zhao et al. "A Survey on the studies of Hardware Trojan," Journal of Cyber Security, vol. 2, No. 1, Jan. 2017. (English abstract attached).
Office Action dated Aug. 23, 2018 in the corresponding Chinese Patent Application No. 201710089783.9 (English translation attached).
Office Action dated Sep. 3, 2018 in the corresponding Chinese Patent Application No. 201710316463.2 (English translation attached).
First Office Action dated Sep. 3, 2018 in corresponding Chinese Patent Application No. 201710316463.2 (and English translation).
Second Office Action dated Nov. 19, 2018 in corresponding Chinese Patent Application No. 201710316463.2 (and English translation).
Office Action dated Jun. 28, 2019 issued in related U.S. Appl. No. 15/895,992.
Second Office Action dated Oct. 22, 2018 in corresponding Chinese Patent Application No. 201710089783.9 (and English translation).
Third Office Action dated Dec. 29, 2018 in corresponding Chinese Patent Application No. 201710089783.9 (and English translation).
Office Action dated Oct. 7, 2019 issued in related U.S. Appl. No. 15/895,686.
Final Office Action dated Oct. 22, 2019 issued in related U.S. Appl. No. 15/895,992.

* cited by examiner

CHECKING METHOD, CHECKING SYSTEM AND CHECKING DEVICE FOR PROCESSOR SECURITY

CROSS-REFERENCE TO RELATED APPLICATION(S)

This application claims priority to a Chinese Patent Application No. 201710316463.2, filed with the Chinese Patent Office on May 8, 2017 and entitled "checking method, checking system and checking device for processor security" and a Chinese Patent Application No. 201710089783.9, filed with the Chinese Patent Office on Feb. 20, 2017 and entitled "checking method, checking device and system for determining security of a processor", which are incorporated herein by reference entirely.

TECHNICAL FIELD

The present disclosure relates to the field of computer technology, and more particularly, to a checking method, a system and a checking device for a processor security.

BACKGROUND

This section is intended to provide a background or context for the embodiments of the present disclosure as set forth in the claims. The description herein is not admitted to be prior art by inclusion in this section.

With the large-scale application of new technologies such as network informatization, information security has become an increasingly serious problem. Usually information security we discussed is limited to a network security, a software security and so on, but recent studies have shown that a hardware security should also be concerned.

Hardware design scale is increasing with a hardware design level, making hardware Trojans possible: factors such as current diversified sources of hardware IP (intellectual Property) used in large-scale circuits represented by CPU (Processor), complication of a hardware design process, refined division of the design and manufacturing process and the like result in a decrease in security controllability of hardware final products. The possibility of being implanted with malicious Trojans or loopholes (hereinafter simply referred to as Trojans) when designing increases, and an increase in hardware scale also increases the difficulty in identifying and discovering Trojans. In recent years, with the development of information security concept, hardware security has become a research hotspot of information security.

SUMMARY

In order to detect hardware vulnerabilities and improve the security of hardware usage, in an embodiment of the present disclosure, a checking method for a processor security is provided, and checking method for a processor security comprises: acquiring a recording information of a data read and write operation between a processor and a peripheral, wherein the data read and write operation is a data read and write operation initiated by the processor or a data read and write operation initiated by the peripheral; and determining whether the processor is secure according to the recording information of the data read and write operation and an analysis result on the data read and write operation by a checking device.

An embodiment of the present disclosure further provides a checking device, which includes: a recording information acquisition module configured to acquire a recording information of a data read and write operation between a processor and a peripheral, wherein the data read and write operation is a data read and write operation initiated by the processor or a data read and write operation initiated by the peripheral; and a security determining module configured to determine whether the processor is secure according to the recording information of the data read and write operation and an analysis result on the data read and write operation by the checking device.

An embodiment of the present disclosure further provides a system for checking a processor security, which includes a processor, peripherals, a memory, an input and output recording device, and the checking device as mentioned above; the memory is configured to store analysis results on data read and write operations by the checking device; and the input and output recording device is configured to record the data read and write operations between the processor and the peripherals.

In the embodiments of the present disclosure, the recording information of the data read and write operations between the processor and the peripherals is acquired, and then it is determined whether the processor is secure according to the recording information of the data read and write operations and the analysis results on the data read and write operations by the checking device. Therefore, it may effectively detect the hardware vulnerabilities, improve the security of hardware usage and ensure the information security.

BRIEF DESCRIPTION OF DRAWINGS

In order to more clearly illustrate technical solutions in embodiments of the disclosure, the attached drawings, which are to be used in the descriptions of the embodiments will be briefly described below. It is apparent that the attached drawings in the following description are merely examples of the disclosure, and other drawings may be obtained by those skilled in the art based on these drawings without creative efforts. In the drawings.

DESCRIPTION OF EMBODIMENTS

In order to enable the objectives, technical solutions, and advantages of the embodiments of the present disclosure to be clearer, the embodiments of the disclosure are described in detail below with reference to the accompanying drawings. Here, the exemplary embodiments of the disclosure and the descriptions thereof are used to explain the disclosure, but are not intended to limit the disclosure.

Hardware security is a foundation of software security. All implementations of software security are based on an assumption that hardware is trusted, i.e., the hardware should work according to behavior defined by its manual. Currently in most cases performance checking for hardware is carried out when designing or leaving the factory. As hardware appears in the form of a black box in a user's system after leaving the factory (unlike software Trojan, code of which is present in a system, and can be read and analyzed), hardware behavior cannot be monitored or perceived. In addition, due to the difficulty in determining the reasonability of the hardware behavior, there is no research on hardware security.

A checking method for a processor security proposed by the present disclosure may check the processor in real time, so as to solve the problem of hardware security. The checking method for a processor security according to an embodiment of the present disclosure may be executed by a checking device. Specifically, the checking device may be integrated with the processor on the same chip or may be implemented as a processor-independent chip, or may also be implemented in other device forms, which is not limited in the present disclosure. For example, a part of functions of the checking device may be integrated on the same chip with the processor, while the remaining other functions may be implemented as independent chips, and all these variations should fall within the protection scope of the present disclosure.

It should be understood that the checking method and the checking device for a processor security provided by the present disclosure can be applied not only to the above-mentioned hardware security checking field, but also to other technical fields without departing from the spirit and principle of the present disclosure, which should fall within the protection scope of the present disclosure.

Various design considerations for determining security of a processor are further described in a U.S. application Ser. No. 15/804,188, filed on Nov. 6, 2017 and entitled "METHOD, CHECKING DEVICE, AND SYSTEM FOR DETERMINING SECURITY OF A PROCESSOR", which is incorporated herein by reference in their entirety as part of disclosure of the present application.

Figure 1:
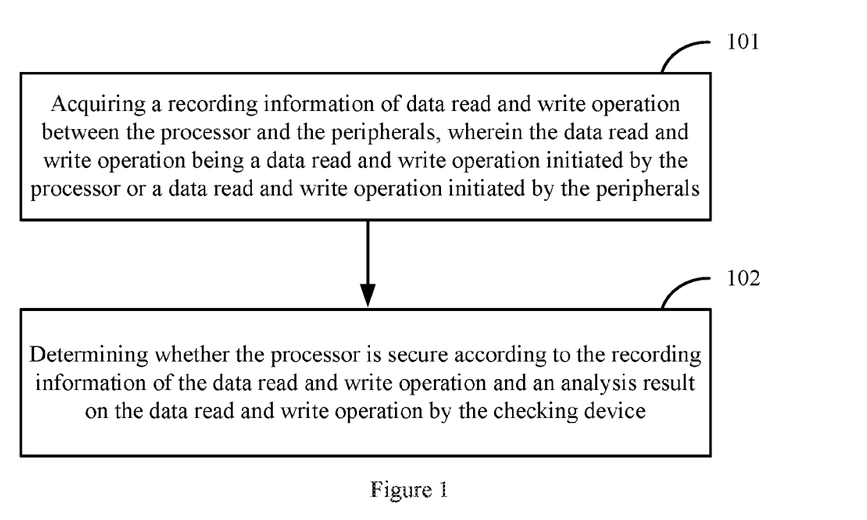
FIG. 1 is a schematic diagram of a checking method for a processor security in accordance with an embodiment of the disclosure.

FIG. 1 is a schematic diagram of a checking method for a processor security in accordance with an embodiment of the disclosure. As shown in FIG. 1, the method may include: Step 101, acquiring a recording information of data read and write operation between the processor and the peripherals, wherein the data read and write operation being a data read and write operation initiated by the processor or a data read and write operation initiated by the peripherals; and Step 102, determining whether the processor is secure according to the recording information of the data read and write operation and an analysis result on the data read and write operation by the checking device.

In an embodiment, the recording information of the data read and write operation between the processor and the peripherals is first acquired. The data read and write operation between the processor and the peripherals may be a data read and write operation initiated by the processor, or may be a data read and write operation initiated by a peripheral. The data read and write operation initiated by the processor may include, for example, a data read and write operation such as MMIO (Memory Mapped I/O); and the data read and write operation initiated by the peripheral may include, for example, a data read and write operation such as DMA (Direct Memory Access), P2P (Peer to Peer) and other types of data read and write operations. It should he understood that the recording information in the embodiment of the present disclosure only relates to the P2P type of data read and write operation by the processor, and does not relate to the P2P type data read and write operation without being processed by the processor.

The recording information of the data read and write operation between the processor and the peripherals may include one or more of various information related to the data read and write operation, and may include, for example, an operation data, an operation address and/or an operation sequence. The operation data may include a data content and a data length. In an embodiment, the operation address may be represented by a peripheral address and a conversion of the peripheral address to the system memory address. In this case, during comparing whether the operation addresses are the same, the peripheral address and the conversion between the peripheral address to the system memory address need to be correct. In an embodiment, for a MMIO type of data read and write operations, it is also possible to record the data read and write operations chronologically to form a recording information sequence, so that the operation sequence of the data read and write operations can be represented by using the order of the data read and write operations in the recording information sequence. The operation sequence is the order in which the processor performs the data read and write operations.

In an embodiment, during determining the security of a running processor, the real-time running process of the processor may be divided into one or more checking intervals. For example, the entire running process of the processor from power-on to power-off may be taken as a target running process, and the entire running process may also be divided into a plurality of target running processes corresponding to multiple checking intervals. In this way, during performing security checking to the processor, it can be implemented as security checking on a running process (that is, the target running process) of the processor in a certain checking interval. After the checking device completes the security checking of the current checking interval, the security checking for the next checking interval is entered. It should be understood that, the embodiments of the present disclosure do not limit the number or length of the checking intervals, and the above variations should fall within the protection scope of the present disclosure. The operation sequence of the data read and write operation may be the order in which the processor or the checking device performs the data read and write operations in a certain checking interval.

In order to check the security of the processor, during implementation, the input information, the output information, the initial running state and the termination running state of the processor during the target running process may be acquired, and the checking device may be set according to the same initial running state and input information, so that the checking device performs the same task as that of the processor under the same conditions and then judges whether a behavior of the processor complies with a hardware behavior criterion according to the consistency between the output information and/or the termination running state of the processor and the checking device, so as to determine the security of the processor during the running process. The input information can be expressed as a sequence of input information, and the output information can be expressed as a sequence of output information. The hardware behavior criterion refers to a behavior standard of the processor in the process of analyzing and executing the software instruction stream. In an embodiment, the hardware behavior criteria of the processor may be a behavior standard as specified in the processor specification or other normative documents.

For example, the initial running state of the checking device may be set according to the initial running state information of the processor in the target running process, and the input information of the processor in the target running process may be used as the input information of the checking device; the output information and/or the termination running state information of the checking device may be obtained in such a way that the checking device executes the task in the target running process in a way of complying with a predefined behavior, wherein the predefined behavior is a hardware behavior criterion of the processor; when the checking device completes the execution of the task in the target running process, it is determined whether the checking device is secure in the target running process according to the output information and/or the termination running state information of the checking device.

The recording information of the data read and write operation in the embodiment of the present disclosure corresponds to the recorded input information and output information of the processor as mentioned above. It should be understood that, the above mentioned input information and output information are not limited to the data read and write operations in the embodiments of the present disclosure, but may also include an output information of the type such as data read and write operations between the processor and the memory.

For example, the recording information of the data read and write operation between the processor and the peripheral may be recorded in the input and output recording device. The input and output recording device may be disposed between the processor and the peripheral for recording the data read and write operations between the processor and the peripheral. In a specific implementation, the recording information of the data read and write operation between the processor and the peripheral may also be recorded in another position, such as a memory of the checking device, which is not limited in the present disclosure.

Taking the recording information being recorded in the input and output recording device as an example, the input and output recording device may record the recording information of the data read and write operation initiated by the processor. For the data read and write operation initiated by the peripheral, since the peripheral initiates an asynchronous data read and write operation (relative to the instruction execution flow of the processor), the input and output recording device may request the processor to process the data read and write operation initiated by the peripheral after recording the recording information, and send the data packet of the data read and write operation initiated by the peripheral to the processor upon receiving an instruction sent by the processor. The processor may suspend execution of a current instruction stream upon receiving the request sent by an input and output recording device, and record the current instruction position and the data read and write operation to be processed which is initiated by the peripheral. The instruction position and the data read and write operation initiated by the peripheral may be recorded by the processor or the checking device in a log information that may be stored at the processor or other position. For example, the log information may be sent by the processor to the input and output recording device for being stored. Certainly, the instruction position and the data read and write operation initiated by the peripheral being recorded in the log information is only one example and they may also be recorded in other information in other forms, which is not limited in the present disclosure.

The input and output recording device may record all of the data read and write operations between the processor and the peripherals to form the above mentioned recording information. Of course, in other embodiments, the input and output recording device may also selectively record only a part of the data read and write operations between the processor and the peripherals. With respect to which part of the data read and write operations between the processor and the peripherals is to be selected for recording, the input and output recording device may preset some conditions or rules or may randomly select to record, which is not limited in the present disclosure. As an example, the input and output recording device may be preset to only record data read and write operations between the processor and some peripherals. In this case, when the processor or peripheral initiates a data read and write operation, the input and output recording device may first acquire an identification (ID) of the peripheral involved in the data read and write operation, and determine whether to record the data read and write operation according to the acquired ID of the peripheral. In particular, it can check whether the acquired peripheral ID is a preset peripheral ID. The preset peripheral ID corresponds to the peripheral for which the data read and write operation with the processor needs to be recorded. If yes, it is determined that the data read and write operation between the processor and the peripheral needs to be recorded.

It should be understood that the input information and output information as described above are relative to the CPU. For example, with respect to the CPU, the data packets flowing from the peripheral to the CPU are the input information of the CPU, and the data packets flowing from the CPU to the peripheral are the output information of the CPU. In a specific implementation, depending on the communication protocol, the read operation flow or the write operation flow executed by the processor may respectively include one or more input information and output information. For example, in a point-to-point Peripheral Component Interconnect Express (PCIe) protocol, a MMIO type of read operation is a processor-initiated operations for reading the peripheral, and a MMIO type of write operation is a processor-initiated operations for writing to the peripheral; a DMA type of read operation is a peripheral-initiated memory operation for reading a CPU address space, a DMA type of write operation is a peripheral-initiated memory operation for writing to the CPU address space; and a P2P type of operation is a peripheral-initiated operation for reading other peripherals or writing to other peripherals.

Taking a flow of a DMA type of read operation as an example: the peripheral sends a read request to the CPU (the read request would be recorded as one input information by the input and output recording device), and after receiving the read request, the CPU returns a data packet corresponding to the read request to the peripheral (the returned data packet would be recorded as one output information by the input and output recording device). In this way, when the checking device reads the recording information from the input and output recording device, the checking device may determine whether the two of the recording information and the data packet belong to one DMA read operation according to the read request and transaction identification in the data packet, and further analyze the DMA read operation, to determine the processor's security. In a specific embodiment, in order to facilitate the input and output recording device to search the stored data packets of the data read and write operations between the processor and the peripherals, the input and output recording device may include: a first partition for recording data packets flowing from the peripherals to the processor and a second partition for recording data packets flowing from the processor to the peripherals.

Further, the inventors consider that if data packets of the data read and write operations between the processor and the peripherals are separately recorded in the first partition and the second partition according to a flow direction of the data packets, due to the asynchronism of the data read and write operations initiated by the peripherals, and other possible useless data packets (e.g., miscellaneous items such as system information), the data information recorded in the first partition and the second partition may be mixed and the retrieval complexity will increase, making it difficult to efficiently obtain the required information entries. Thus, in order to improve data retrieval efficiency, in a specific embodiment, the input and output recording device may record and organize the recorded data packets according to the type of the read and write operation. In particular, the recorded data packets flowing from the peripherals to the processor may be organized in the first partition according to the type of the data read and write operation, and the recorded data packets flowing from the processor to the peripherals may be organized in the second partition according to the type of the data read and write operation, so as to improve data retrieval efficiency.

The processor may send an instruction to the input and output recording device after recording the instruction position and the data read and write operation to be processed which is initiated by the peripheral. The input and output recording device may receive the instruction, the processor may send the data packet of the data read and write operation to be processed to the input and output recording device, and the processor may complete the data read and write operation to be processed. When the checking device analyzes the data read and write operation initiated by the peripheral, it acquires the log information about the data read and write operation initiated by the peripheral so as to analyze the data read and write operation initiated by the peripheral according to the log information. In this way, when the checking device executes a task in the target running process in a manner consistent with the predefined behavior, the data read and write operation initiated by the peripheral may be analyzed and executed at the instruction position. As mentioned above, the log information includes the instruction position and the data read and write operation initiated by the peripheral, where the instruction position is an instruction position at which the processor processes the data read and write operation initiated by the peripheral.

After acquiring the recording information of the data read and write operation between the processor and the peripheral, it may be determined whether the processor is secure according to the acquired recording information and the analysis result on the data read and write operation by the checking device. For the data read and write operation initiated by the processor and the data read and write operation initiated by the peripheral, there are different implementation modes in determining the processor security due to the different execution processes of data read and write operations. This will be described in the following respectively.

If the data read and write operation is an MMIO type of read operation, the operation address and the data length in the recording information are compared with the operation address and the data length obtained by analyzing the MMIO type of read operation by the checking device, and the operation sequence in the recording information is compared with the operation sequence obtained by analyzing MMIO type of read operation by the checking device. When the comparison results are consistent with each other, it is determined that the processor is secure during performing the MMIO type of read operation, otherwise it is determined that the processor is not secure during performing the MMIO type of read operation. For example, when the checking device processes the MMIO type of read operation, the corresponding instruction is parsed to obtain its operation address and data length for comparison with the recording information read from the input and output recording device. In addition, the checking device also needs to compare the operation sequence of the MMIO type of read operation (for example, the operation sequence may be indicated by the position of the MMIO type of read operation in the recording information sequence). When one of the operation address, the operation sequence and the data length is inconsistent, it is determined that the processor is not secure during performing the MMIO type of read operation. In this case, the checking device may also stop checking the current checking interval, and further determine that the processor is not secure in the checking interval. When the operation address, the data length and the operation sequence are consistent, the processor may read the corresponding data packet from the input and output recording device, and then analyze the next data read and write operation.

If the data read and write operation is an MMIO type of write operation, the specific process of determining whether the processor is secure may include: comparing the operation address, the data content and the data length in the recording information with the operation address, the data content and the data length obtained by analyzing the MMIO type of write operation by the checking device, and comparing the operation sequence in the recording information with the operation sequence obtained by analyzing the MMIO type of write operation by the checking device. When the comparison results are consistent with each other, it is determined that the processor is secure during performing the MMIO type of write operation, otherwise it is determined that the processor is not secure during performing the MMIO type of write operation. For example, when the checking device processes the MMIO type of write operation, the corresponding command is parsed to obtain the operation address, the data content and the data length to be written out for comparison with the recording information read from the input and output recording device. In addition, the checking device also needs to compare the operation sequence of the MMIO type of write operation (for example, the operation sequence may be indicated by the position of the MMIO type of write operation in the recording information sequence). When one of the operation address, the data content, the data length and the operation sequence is inconsistent, it is determined that the processor is not secure during performing the MMIO type of write operation. In this case, the checking device may also stop checking the current checking interval, and further determine that the processor is not secure in the checking interval. When the operation address, the data content, the data length and the operation sequence are consistent, the processor may analyze the next data read and write operation.

If the data read and write operation is a DMA type of read operation, the specific process of determining whether the processor is secure may include: comparing the operation address, the data content and the data length in the recording information with the operation address, the data content and the data length obtained by analyzing the DMA type of read operation by the checking device. When the comparison results are consistent with each other, it is determined that the processor is secure during performing the DMA type of read operation, otherwise it is determined that the processor is not secure during performing the DMA type of read operation. Except for not needing to compare the operation sequence, the process in which the checking device analyzes and detects the DMA type read operation is similar to that for the MMIO type of write operation. To avoid repetition, details are not described herein again.

If the data read and write operation is a DMA type of write operation, the operation address and the data length of the operation data in the recording information may be compared with the operation address and the data length obtained by analyzing the DMA type of write operation by the checking device. When the comparison results are consistent with each other, it is determined that the processor is secure during performing the DMA type of write operation, otherwise it is determined that the processor is not secure during performing the DMA type of write operation. Except for not needing to compare the operation sequence, the process in which the checking device analyzes and detects the DMA type of write operation is similar to that for the MMIO type of read operation. To avoid repetition, details are not described herein again.

If the data read and write operation is a P2P type of data read and write operation, the specific process of determining whether the processor is secure may include: comparing the data content and the data length flowing from the peripheral to the processor with the data content and the data length flowing from the processor to the destination peripheral of the P2P type of data read and write operation in the recording information. When the comparison results are consistent with each other, it is determined that the processor is secure during performing the P2P type of data read and write operation, otherwise it is determined that the processor is not secure during performing the P2P type of data read and write operation. It should be understood that, when comparing the data content and the data length flowing from the peripheral to the processor with the data content and the data length flowing from the processor to the destination peripheral, the checking device needs to ensure that they are from the same P2P type of data read and write operation. Specifically, it is possible to distinguish whether they are from the same P2P type of data read and write operation by using one or more of the transaction identification, the source address, and the destination address.

Based on the same inventive concept, an embodiment of the present disclosure further provides a checking device, as described in the following embodiments. Since the principle of the checking device to solve the problem is similar to that of the checking method for a processor security, the implementation of the checking device may refer to the implementation of the processor security checking method, and details are not described herein again.

Figure 2:
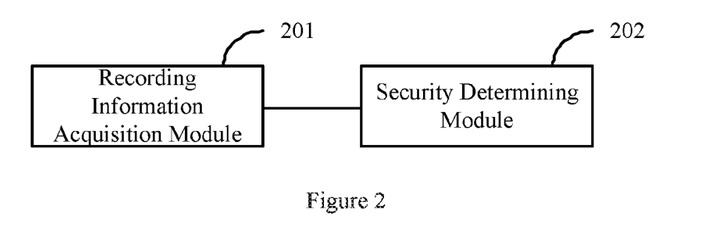
FIG. 2 is a schematic diagram of a checking device in accordance with an embodiment of the disclosure.

FIG. 2 is a schematic diagram of a checking device in accordance with an embodiment of the disclosure. As shown in FIG. 2, the checking device may include: a recording information acquisition module 201 configured to acquire recording information of a data read and write operation between the processor and the peripheral, wherein the data read and write operation is a data read and write operation initiated by the processor or a data read and write operation initiated by the peripheral; and a security determining module 202 configured to determine whether the processor is secure according to the recording information of the data read and write operation and an analysis result on the data read and write operation by the checking device.

Figure 3:
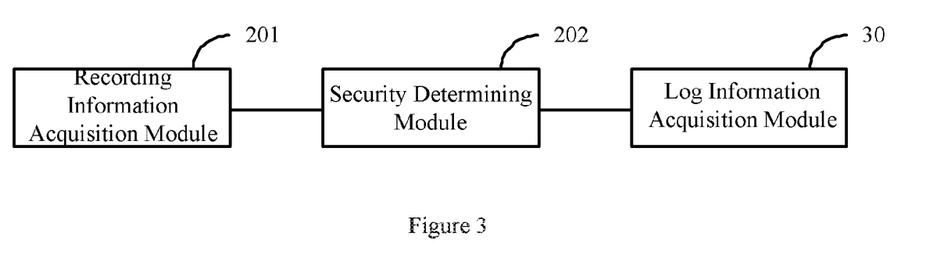
FIG. 3 is a specific example diagram of the checking device illustrated in FIG. 2 in accordance with an embodiment of the disclosure.

FIG. 3 is a specific example diagram of the checking device as shown in FIG. 2 in accordance with an embodiment of the disclosure. As shown in FIG. 3, the checking device shown in FIG. 2 in this example may further include: a log information acquisition module 301 configured to acquire log information of a data read and write operation initiated by the peripheral, so that the checking device analyzes the data read and write operation initiated by the peripheral according to the log information. The log information includes the instruction position and the data read and write operation initiated by the peripheral, and the instruction position is an instruction position at which the processor processes the data read and write operation initiated by the peripheral.

As mentioned above, in a specific embodiment, the processor-initiated data read and write operation may include an MMIO type of data read and write operation; and/or the peripheral-initiated data read and write operation may include a DMA or P2P type of data read and write operation.

As mentioned above, in a specific embodiment, the security determining module is specifically configured to: when the data read and write operation is an MMIO type of read operation, compare the operation address and the data length in the recording information with the operation address and the data length obtained by analyzing the MMIO type of read operation by the checking device, and compare the operation sequence in the recording information with the operation sequence obtained by analyzing the MMIO type of read operation by the checking device; and when the comparison results are consistent with each other, determine that the processor is secure during performing the MMIO type of read operation, otherwise determine that the processor is not secure during performing the MMIO read operation.

As mentioned above, in a specific embodiment, the security determining module is specifically configured to: when the data read and write operation is an MMIO type of write operation, compare the operation address, the data content and the data length in the recording information with the operation address, the data content and the data length obtained by analyzing the MMIO type of write operation by the checking device, and compare the operation sequence in the recording information with the operation sequence obtained by analyzing the MMIO type of write operation by the checking device; and when the comparison results are consistent with each other, determine that the processor is secure during performing the MMIO type of write operation, otherwise determine that the processor is not secure during performing the MMIO type of write operation.

As mentioned above, in a specific embodiment, the security determining module is specifically configured to: when the data read and write operation is a DMA type of read operation, compare the operation address, the data content and the data length in the recording information with the operation address, the data content and the data length obtained by analyzing the DMA type of read operation by the checking device; and when the comparison results are consistent with each other, determine that the processor is secure during performing the DMA type of read operation, otherwise determine that the processor is not secure during performing the DMA type of read operation.

As mentioned above, in a specific embodiment, the security determining module is specifically configured to: when the data read and write operation is a DMA type of write operation, compare the operation address and the data length of the operation data in the recording information with the operation address the data length obtained by analyzing the DMA type of write operation by the checking device; and when the comparison results are consistent with each other, determine that the processor is secure during performing the DMA type of write operation, otherwise determine that the processor is not secure during performing the DMA type of write operation.

As mentioned above, in a specific embodiment, the security determining module is specifically configured to: when the data read and write operation is a P2P type of data read and write operation, compare the data content and the data length flowing from the peripheral to the processor with the data content and the data length flowing from the processor to the destination peripheral of the P2P type of data read and write operation in the recording information; and when the comparison results are consistent with each other, determine that the processor is secure during performing the P2P type of data read and write operation, otherwise determine that the processor is not secure during performing the P2P type of data read and write operation.

Based on the same inventive concept, an embodiment of the present disclosure further provides a checking system for a processor security, as described in the following embodiments. Since the principle of the checking system for a processor security to solve the problem is similar to those of the checking method and the checking device for a processor security, the implementation of the processor security checking system may refer to the implementation of the checking method and the checking device for a processor security, and details are not described herein again.

Figure 4:
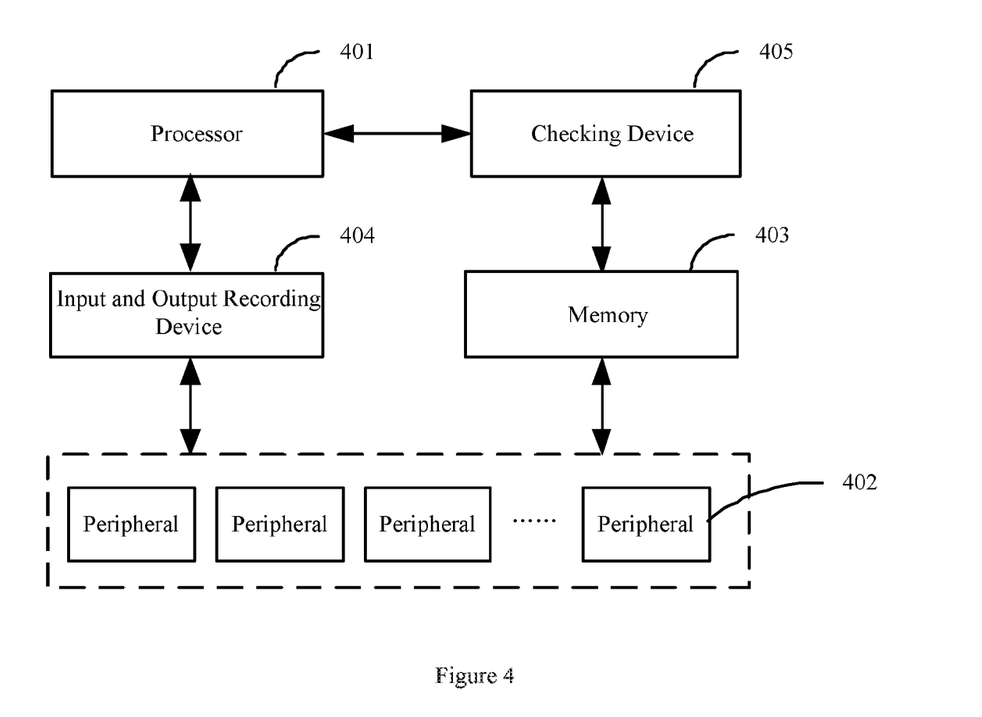
FIG. 4 is a schematic diagram of a checking system for a processor security in accordance with an embodiment of the disclosure.

FIG. 4 is a schematic diagram of a checking system for a processor security in accordance with an embodiment of the disclosure. As shown in FIG. 4, the checking system for a processor security may include a processor 401, peripherals 402, a memory 403, an input and output recording device 404, and the checking device 405 as mentioned above. The memory 403 may be configured to store the results of the data read and write operations performed by the checking device 405. The input and output recording device 404 may be configured to record data read and write operations between the processor 401 and the peripherals 402.

It should be understood that, the input and output recording device 404 may be implemented as a part of the checking device 405, or may he controlled by other processors independently of the checking device, which is not limited in the embodiments of the present disclosure.

To sum up, in the embodiments of the present disclosure, the recording information of the data read and write operations between the processor and the peripherals is acquired, and then it is determined whether the processor is secure according to the recording information of the data read and write operations and the analysis results on the data read and write operations by the checking device. Therefore, it can effectively detect the hardware vulnerabilities, improve the security of hardware usage and ensure the information security.

An embodiment of the present disclosure further provides an electronic device, which may be a desktop computer or the like and is not limited to the present embodiment. In this embodiment, the electronic device may refer to the implementation of the processor security checking method shown in FIG. 1 and the implementation of the processor security checking device shown in FIG. 2, the contents of which are incorporated here, and details are not described herein again.

Figure 5:
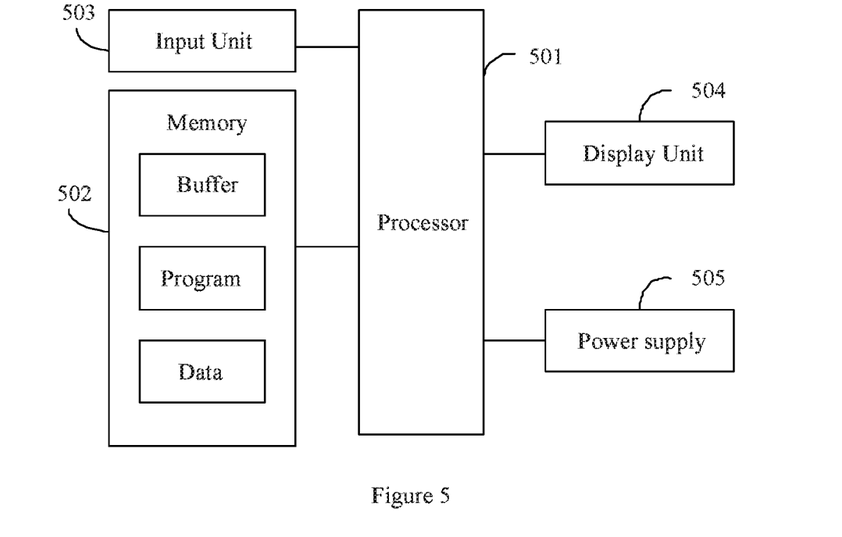
FIG. 5 is a schematic block diagram of a system configuration of an electronic device in accordance with an embodiment of the disclosure.

FIG. 5 is a schematic block diagram of a system configuration of an electronic device in accordance with an embodiment of the disclosure. As shown in FIG. 5, the electronic device may include a processor 501 and a memory 502 coupled to the processor 501. It should be noted that the figure is exemplary and that other types of structures may also be used to supplement or replace the structure for communicating, checking or other functions.

In an embodiment, the processor 501 may integrate functions of processor security checking. For example, the processor 501 may be configured to perform control to: acquire recording information of a data read and write operation between the processor and the peripheral, where the data read and write operation is a data read and write operation initiated by the processor or a data read and write operation initiated by the peripheral; and determine whether the processor is secure according to the recording information of the data read and write operation and the analysis result on the data read and write operation by the checking device.

The data read and write operation is a data read and write operation initiated by the peripheral, and before determining whether the processor is secure according to the recording information of the data read and write operation and the analysis result on the data read and write operation by the checking device, the log information of the data read and write operation initiated by the peripheral is acquired, so that the checking device analyzes the data read and write operation initiated by the peripheral according to the log information, wherein the log information includes an instruction position and the data read and write operation initiated by the peripheral, and the instruction position is an instruction position at which the processor processes the data read and write operation initiated by the peripheral.

The data read and write operation initiated by the processor may include a memory mapped I/O (MMIO) type of data read and write operation; and/or the data read and write operation initiated by the peripheral may include a Direct Memory Access (DMA) type of or a Peer to Peer communication "P2P" type of data read and write operation.

Determining whether the processor is secure according to the recording information of the data read and write operation and the analysis result on the data read and write operation by the checking device may include: when the data read and write operation is an MMIO type of read operation, comparing the operation address and the data length in the recording information with the operation address and the data length obtained by analyzing the MMIO type of read operation by the checking device, and comparing the operation sequence in the recording information with the operation sequence obtained by analyzing the MMIO type of read operation by the checking device; and when the comparison results are consistent with each other, determining that the processor is secure during performing the MMIO type of read operation, otherwise determining that the processor is not secure during performing the MMIO read operation.

Determining whether the processor is secure according to the recording information of the data read and write operation and the analysis result on the data read and write operation by the checking device may include: when the data read and write operation is an MMIO type of write operation, comparing the operation address, the data content and the data length in the recording information with the operation address, the data content and the data length obtained by analyzing the MMIO type of write operation by the checking device, and comparing the operation sequence in the recording information with the operation sequence obtained by analyzing the MMIO type of write operation by the checking device; and when the comparison results are consistent with each other, determining that the processor is secure during performing the MMIO type of write operation, otherwise determining that the processor is not secure during performing the MMIO type of write operation.

Determining whether the processor is secure according to the recording information of the data read and write operation and the analysis result on the data read and write operation by the checking device may include: when the data read and write operation is a DMA type of read operation, comparing the operation address, the data content and the data length in the recording information with the operation address, the data content and the data length obtained by analyzing the DMA type of read operation by the checking device; and when the comparison results are consistent with each other, determining that the processor is secure during performing the DMA type of read operation, otherwise determining that the processor is not secure during performing the DMA type of read operation.

Determining whether the processor is secure according to the recording information of the data read and write operation and the analysis result on the data read and write operation by the checking device may include: when the data read and write operation is a DMA type of write operation, comparing the operation address and the data length of the operation data in the recording information with the operation address the data length obtained by analyzing the DMA type of write operation by the checking device; and when the comparison results are consistent with each other, determining that the processor is secure during performing the DMA type of write operation, otherwise determining that the processor is not secure during performing the DMA type of write operation.

Determining whether the processor is secure according to the recording information of the data read and write operation and the analysis result on the data read and write operation by the checking device may include: when the data read and write operation is a P2P type of data read and write operation, comparing the data content and the data length flowing from the peripheral to the processor with the data content and the data length flowing from the processor to the destination peripheral of the P2P type of data read and write operation in the recording information; and when the comparison results are consistent with each other, determining that the processor is secure during performing the P2P type of data read and write operation, otherwise determining that the processor is not secure during performing the P2P type of data read and write operation.

In another embodiment, the checking device may be implemented as the electronic device shown in FIG. 5. The processor security checking function may be configured separately from the processor 501. For example, the processor security checking function may be configured on a chip connected to the processor 501, and the function of processor security checking may be implemented through the control of the processor 501.

As shown in FIG. 5, the electronic device may further include an input unit 503, a display unit 504 and a power supply 505. It should be noted that the electronic device does not have to include all of the components shown in FIG. 5. In addition, the electronic device may further include components not shown in FIG. 5, and reference may be made to the related art.

As shown in FIG. 5, the processor 501, sometimes referred to as a controller or operation control, may include a microprocessor or other processor device and/or logic device that receives input and controls the operations of various components of the electronic device.

The memory 502 may be, for example, one or more of a buffer, a flash memory, a hard drive, a removable medium, a volatile memory, a non-volatile memory or other suitable device, and may store one or more of the configuration information of the above processor 501, instructions executed by the processor 501, recorded information, and the like. The processor 501 may execute a program stored in the memory 502 to implement information storage or processing and the like. In an embodiment, a buffer memory, that is, a buffer, is further included in the memory 502 to store the intermediate information.

The input unit 503 may be, for example, a key input device or a touch input device for providing input to the processor 501. The display unit 504 is configured to display a display object such as an image or a text. The display unit may be an LCD display, for example, but the present disclosure is not limited thereto. The power source 505 is configured to supply power to the electronic device.

An embodiment of the present disclosure further provides a computer readable instruction, wherein when the instruction is executed in the electronic device, the program causes the electronic device to perform the checking method for a processor security as shown in FIG. 1.

An embodiment of the present disclosure further provides a storage medium storing computer readable instructions, wherein the computer readable instructions cause the electronic device to perform the processor security checking method as shown in FIG. 1.

Those skilled in the art should understand that the embodiments of the present disclosure may be provided as a method, a system, or a computer program product. Accordingly, the present disclosure may take the form of an entirely hardware embodiment, an entirely software embodiment, or an embodiment combining software and hardware. Moreover, the disclosure may take the form of a computer program product embodied on one or more computer usable storage media (including but not limited to magnetic disk storage, CD-ROM, optical storage and the like) containing computer usable program code.

The present disclosure is described with reference to flowcharts and/or block diagrams of a method, an apparatus (system), and a computer program product according to an embodiment of the disclosure. It will be understood that each flow and/or block in the flowcharts and/or block diagrams, and combinations of the flows and/or blocks in the flowcharts and/or the block diagrams, may be implemented by computer program instructions. These computer program instructions may be provided to a processor of a general purpose computer, special purpose computer, embedded processor, or other programmable data processing apparatus to produce a machine such that the instructions, which are executed via the processor of the computer or other programmable data processing apparatus, produce means for implementing the functions specified in one or more flows in the flowcharts and/or one or more blocks in the block diagrams.

These computer program instructions may also be stored in a computer readable memory that can direct a computer or other programmable data processing apparatus to function in a particular manner such that the instructions stored in the computer readable memory produce an article of manufacture including instruction means that implements the functions specified in one or more flows in the flowcharts and/or one or more blocks in the block diagrams.

These computer program instructions may also be loaded onto a computer or other programmable data processing apparatus to cause a series of operating steps to be performed on the computer or other programmable apparatus to produce computer-implemented processes, such that the instructions which execute on the computer or other programmable apparatus provide the steps for implementing the functions specified in one or more flows in the flowcharts and/or one or more blocks in the block diagrams.

The objectives, technical solutions and beneficial effects of the present disclosure are further described in detail with reference to the specific embodiments described above. It should be understood that the foregoing descriptions are merely specific embodiments of the present disclosure, but are not intended to limit the protection scope of the present disclosure. Any modifications, equivalent substitutions, improvements, and the like made within the spirit and. principle of the present disclosure should be included within the protection scope of the present disclosure.

What is claimed is:

1. A method for checking a processor security, comprising:
    acquiring a recording information of a data read and write operation between a processor and a peripheral, wherein the data read and write operation is a data read and write operation initiated by the processor or and a data read and write operation initiated by the peripheral;
    acquiring a log information of the data read and write operation initiated by the peripheral, when the data read and write operation is a data read and write operation initiated by the peripheral, so that a checking device analyzes the data read and write operation initiated by the peripheral according to the log information, wherein the log information comprises an instruction position and the data read and write operation initiated by the peripheral, and the instruction position is an instruction position at which the processor suspends execution of an instruction and processes the data read and write operation initiated by the peripheral; and
    determining whether the processor is secure according to the recording information of the data read and write operation and an analysis result on the data read and write operation by the checking device.

2. The method according to claim 1, wherein the data read and write operation initiated by the processor comprises a Memory Mapped I/O "MMIO" type of data read and write operation; and/or the data read and write operation initiated by the peripheral comprises a Direct Memory Access "DMA" type of or a Peer to Peer communication "P2P" type of data read and write operation.

3. The method according to claim 2, wherein determining whether the processor is secure according to the recording information of the data read and write operation and the analysis result on the data read and write operation by the checking device comprises:
    when the data read and write operation is an MMIO type of read operation, comparing an operation address and a data length in the recording information with an operation address and a data length obtained by analyzing the MMIO type of read operation by the checking device, and comparing an operation sequence in the recording information with an operation sequence obtained by analyzing the MMIO type of read operation by the checking device; and
    when the comparison results are consistent with each other, determining that the processor is secure during performing the MMIO type of read operation, otherwise determining that the processor is not secure during performing the MMIO type of read operation.

4. The method according to claim 2, wherein determining whether the processor is secure according to the recording information of the data read and write operation and the analysis result on the data read and write operation by the checking device comprises:
    when the data read and write operation is an MMIO type of write operation, comparing an operation address, a data content and a data length in the recording information with an operation address, a data content and a data length obtained by analyzing the MMIO type of write operation by the checking device, and comparing an operation sequence in the recording information with an operation sequence obtained by analyzing the MMIO type of write operation by the checking device; and
    when the comparison results are consistent with each other, determining that the processor is secure during performing the MMIO type of write operation, otherwise determining that the processor is not secure during performing the MMIO type of write operation.

5. The method according to claim 2, wherein determining whether the processor is secure according to the recording information of the data read and write operation and the analysis result on the data read and write operation by the checking device comprises:
    when the data read and write operation is a DMA type of read operation, comparing an operation address, a data content and a data length in the recording information with an operation address, a data content and a data length obtained by analyzing the DMA type of read operation by the checking device; and
    when the comparison results are consistent with each other, determining that the processor is secure during performing the DMA type of read operation, otherwise determining that the processor is not secure during performing the DMA type of read operation.

6. The method according to claim 2, wherein determining whether the processor is secure according to the recording information of the data read and write operation and the analysis result on the data read and write operation by the checking device comprises:
    when the data read and write operation is a DMA type of write operation, comparing an operation address and a data length of the operation data in the recording information with an operation address and a data length obtained by analyzing the DMA type of write operation by the checking device; and
    when the comparison results are consistent with each other, determining that the processor is secure during performing the DMA type of write operation, otherwise determining that the processor is not secure during performing the DMA type of write operation.

7. The method according to claim 2, wherein determining whether the processor is secure according to the recording information of the data read and write operation and the analysis result on the data read and write operation by the checking device comprises:
    when the data read and write operation is a P2P type of data read and write operation, comparing a data content and a data length flowing from the peripheral to the processor with a data content and a data length flowing from the processor to the destination peripheral of the P2P type of data read and write operation in the recording information; and
    when the comparison results are consistent with each other, determining that the processor is secure during performing the P2P type of data read and write operation, otherwise determining that the processor is not secure during performing the P2P type of data read and write operation.

8. A checking device for a processor security, comprising a microprocessor configured to:
acquire a recording information of a data read and write operation between a processor and a peripheral, wherein the data read and write operation is a data read and write operation initiated by the processor and a data read and write operation initiated by the peripheral;
acquire a log information of a data read and write operation initiated by the peripheral, when the data read and write operation is a data read and write operation initiated by the peripheral, so that the checking device analyzes the data read and write operation initiated by the peripheral according to the log information, wherein the log information comprises an instruction position and the data read and write operation initiated by the peripheral, and the instruction position is an instruction position at which the processor suspends execution of an instruction and processes the data read and write operation initiated by the peripheral; and
determine whether the processor is secure according to the recording information of the data read and write operation and an analysis result on the data read and write operation by the checking device.

9. The checking device according to claim 8, wherein the data read and write operation initiated by the processor comprises an MMIO type of data read and write operation; and/or the data read and write operation initiated by the peripheral comprises a Direct Memory Access "DMA" type or a P2P type of data read and write operation.

10. The checking device according to claim 9, wherein the microprocessor is further configured to:
when the data read and write operation is an MMIO type of read operation, compare an operation address and a data length in the recording information with an operation address and a data length obtained by analyzing the MMIO type of read operation by the checking device, and compare an operation sequence in the recording information with an operation sequence obtained by analyzing the MMIO type of read operation by the checking device; and
when the comparison results are consistent with each other, determine that the processor is secure during performing the MMIO type of read operation, otherwise determine that the processor is not secure during performing the MMIO type of read operation.

11. The checking device according to claim 9, wherein the microprocessor is further configured to:
when the data read and write operation is an MMIO type of write operation, compare an operation address, a data content and a data length in the recording information with an operation address, a data content and a data length obtained by analyzing the MMIO type of write operation by the checking device, and compare an operation sequence in the recording information with an operation sequence obtained by analyzing the MMIO type of write operation by the checking device; and
when the comparison results are consistent with each other, determine that the processor is secure during performing the MMIO type of write operation, otherwise determine that the processor is not secure during performing the MMIO type of write operation.

12. The checking device according to claim 9, wherein the microprocessor is further configured to:
when the data read and write operation is a DMA type of read operation, compare an operation address, a data content and a data length in the recording information with an operation address, a data content and a data length obtained by analyzing the DMA type of read operation by the checking device; and
when the comparison results are consistent with each other, determine that the processor is secure during performing the DMA type of read operation, otherwise determine that the processor is not secure during performing the DMA type of read operation.

13. The checking device according to claim 9, wherein the microprocessor is further configured to:
when the data read and write operation is a DMA type of write operation, compare an operation address and a data length of the operation data in the recording information with an operation address and a data length obtained by analyzing the DMA type of write operation by the checking device; and
when the comparison results are consistent with each other, determine that the processor is secure during performing the DMA type of write operation, otherwise determine that the processor is not secure during performing the DMA type of write operation.

14. The checking device according to claim 9, wherein the microprocessor is further configured to:
when the data read and write operation is a P2P type of data read and write operation, compare a data content and a data length flowing from the peripheral to the processor with a data content and a data length flowing from the processor to the destination peripheral of the P2P type of data read and write operation in the recording information; and
when the comparison results are consistent with each other, determine that the processor is secure during performing the P2P type of data read and write operation, otherwise determine that the processor is not secure during performing the P2P type of data read and write operation.

15. A non-transitory computer-readable storage medium having stored thereon a computer program comprising instructions which, being executed on a processor, causes the processor to carry out the method according to claim 1.

16. A non-transitory computer-readable storage medium having stored thereon a computer program comprising instructions which, when being executed on a processor, causes the processor to:
acquire a recording information of a data read and write operation between a processor and a peripheral, wherein the data read and write operation is a data read and write operation initiated by the processor or and a data read and write operation initiated by the peripheral;
acquire a log information of the data read and write operation initiated by the peripheral, when the data read and write operation is a data read and write operation initiated by the peripheral, so that a checking device analyzes the data read and write operation initiated by the peripheral according to the log information, wherein the log information comprises an instruction position and the data read and write operation initiated by the peripheral, and the instruction position is an instruction position at which the processor suspends execution of an instruction and processes the data read and write operation initiated by the peripheral; and
determine whether the processor is secure according to the recording information of the data read and write operation and an analysis result on the data read and write operation by the checking device.

\* \* \* \* \*